United States Patent [19]

Feinbloom

[11] Patent Number: 4,555,164
[45] Date of Patent: Nov. 26, 1985

[54] ANAMORPHIC LENS SYSTEM INCREASING THE FIELD OF VIEW FOR THE VISUALLY HANDICAPPED

[75] Inventor: William Feinbloom, Highland, N.Y.

[73] Assignee: Designs for Vision, Inc., New York, N.Y.

[21] Appl. No.: 471,765

[22] Filed: Mar. 3, 1983

[51] Int. Cl.$^4$ .................... G02B 27/02; G02B 13/00
[52] U.S. Cl. ...................................... 350/420; 351/41
[58] Field of Search ............... 350/420, 433, 469, 434, 350/145, 437, 440

[56] References Cited

U.S. PATENT DOCUMENTS

| | | | |
|---|---|---|---|
| 3,002,427 | 10/1961 | Schafter et al. | 350/420 |
| 3,511,557 | 5/1970 | Lindstedt et al. | 350/420 |
| 3,822,932 | 7/1974 | Humphrey | 350/420 |
| 4,364,645 | 12/1982 | Feinbloom | 351/204 |

Primary Examiner—John K. Corbin
Assistant Examiner—Rebecca D. Gass
Attorney, Agent, or Firm—Arthur L. Plevy

[57] ABSTRACT

There is disclosed an anamorphic lens system for increasing the field of view for patients or persons having tunnel vision. The lens assembly consists of a plano-concave cylindrical lens separated from a plano-convex cylindrical lens. The lens system is an anamorphic lens system which minifies in one meridian or axis such as the X axis while keeping objects at the same size in the other meridian such as the Y axis. In utilizing the system, a handicapped patient is now able to maintain almost their original visual acuity in the vertical plane while the system produces minification in the horizontal plane. By using such a technique, the patient retains almost full visual acuity, experiences a substantial increase in his field of vision, and furthermore, does not lose the ability to judge depth.

13 Claims, 5 Drawing Figures

ANAMORPHIC LENS SYSTEM INCREASING THE FIELD OF VIEW FOR THE VISUALLY HANDICAPPED

BACKGROUND OF INVENTION

This invention relates to a lens system for improving the field of view of the visually handicapped and more particularly to an anamorphic lens system.

There are patients who exhibit visual handicaps that manifest themselves in eye conditions that produce tunnel vision. Such patients usually have good central vision (within the narrow confines of the tunnel vision) and are limited to fields of view of about 5 to 15 degrees. Accordingly, such persons virtually have no peripheral vision. Such a condition which manifests itself in tunnel vision is found in cases of Retinitis Pigmentosa.

Retinitis Pigmentosa is an inherited disease which is usually first observed in patients between the ages of 8 to 14 years. As these patients become older, the peripheral field of view generally grows smaller and smaller. Although Retinitis Pigmentosa is a major cause of tunnel vision, there are other diseases that also produce a loss of the peripheral field. In any event, the afflicted person who may have a typical central field of 5, 10, or 15 degrees is still able to walk around and to perform other tasks by combining their eye movement with head movement to enable them to scan the surrounding environment. However, at any instant, they only see a very limited field and must mentally combine these many limited fields to perceive some semblance of real space.

Essentially, the ability of the brain to correlate such information enables them to function with rather limited field of view.

For normal eyes the average field of vision is about 135 degrees in each eye and binocularly such persons have a 180 degree field of vision. This, of course, is inherent with peripheral vision.

In contrast patients afflicted with Retinitis Pigmentosa may have a field of view as little as 5 degrees and hence must constantly scan the scene in front of them by eye and head movement to avoid bumping into people or objects.

The condition of tunnel vision as manifested by many of these afflictions has been known since ancient times and all attempts proposed to provide a practical solution to increase this field have failed for one reason or another.

A particular approach which was experimented with in the prior art was to prescribe a reverse telescopic spectacle to increase the field of vision. This approach has not worked for two main reasons.

First, the regular reverse telescopic spectacle does not minify space and allows the patient to take in a larger field of view, but at the same time, it also reduces the patient's visual acuity. That is, a reverse telescope will provide minification in both the vertical and horizontal meridians or planes and therefore reduces such objects in size, thus reduces his amount of vision or visual acuity.

For example, if the reverse telescope minifies by a factor of $-2.0X$, then the percentage of vision or visual acuity will be reduced by two times or cut in half.

The second objection results because of the reduction in size of the image, the patient experiences a misjudgement of position because the object in space appears to be twice as far away in the above example.

These two factors are inherent characteristics of all reversed telescopic systems which normally employ spherical lenses.

Basically, it is an object of this invention to maintain one meridian at a constant size by the use of a special telescopic spectacle. It has been determined experimentally that in offering such a system, the acuity of the patient is preserved while further allowing the patient to make accurate judgements in distances. By use of this invention the patient may walk up steps, work in a factory or at home and in general will be able to perform normal tasks with good visual acuity and distance judgement.

In describing the invention, it is designated as an anamorphic lens system and constitutes lenses having a different power vertically and a different power horizontally. In this manner the lens system produces minification in the horizontal meridian only, while leaving the vertical meridian with zero effect.

This minification of the horizontal meridian only provides the patient with a wider field of view by fitting, for example, 10 degrees of real space into the patient's own 5 degree field. Thus, the horizontal field of view for the patient is increased by the same percentage as the power of the anamorphic system, according to the minification, as will be explained.

The anamorphic lens assembly is essentially a reverse cylindrical telescope that minifies in one meridian or axis as the horizontal, while maintaining the image of the vertical meridian at the same size.

BRIEF DESCRIPTION OF THE PREFERRED EMBODIMENT

A lens assembly for increasing the field of vision of a user having a visual handicap indicative of a condition designated as tunnel vision, said lens assembly operative to increase the field of view by minifying optically in one plane, while substantially not altering the object size in another plane transverse to said one plane, comprising a first cylindrical lens assembly positioned at a given distance from a second cylindrical lens assembly, with said first and second lens assemblies positioned near the eye of said user to enable said user to perceive with normal acuity in said one plane and with a minification of vision in said another plane with said minification proportional to the increase in user's field of view.

DETAILED DESCRIPTION OF THE FIGURES

Figure 1:
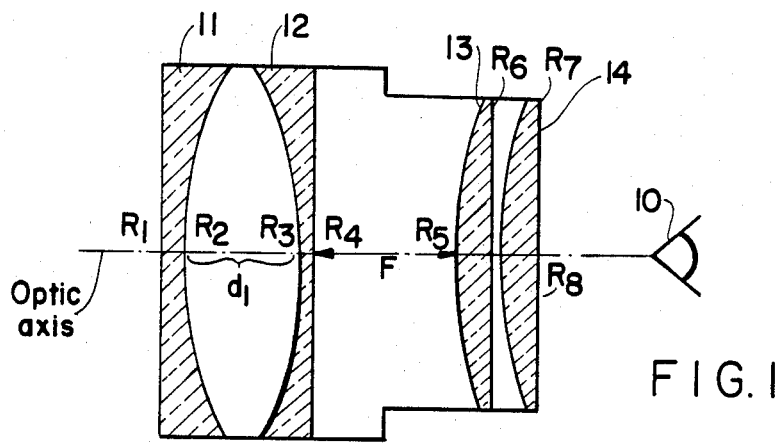
FIG. 1 is a schematic plan view of an anamorphic lens assembly according to this invention.

Referring to FIG. 1, there is shown a schematic diagram of an anamorphic lens system according to this invention. Anamorphic lenses are usually made of all precision plano-cylindrical surfaces. In the system to be described, the lenses are depicted as plano on one surface and having plano-concave or plano-convex cylindrical radii on the other surface.

The axis of the cylinder surface or lens is that meridian of zero power or infinite radius. This axis is not the optic axis of the system. The system to be described which employs anamorphic lenses provides a reverse Gallilean type telescope, that produces minification in the horizontal meridian or plane and no magnification or no minification in the vertical meridian or plane. The optic axis of the system is the theoretical line joining the optical centers of each lens in the system. In an anamorphic system employing cylindrical lenses, the optical centers of the lenses must be aligned and the cylindrical axes of each lens must be co-linear with every other lens, while all lenses must be set or adjusted at ninety degrees vertical.

The patient's eye 10 is shown in position. Essentially, the lens system consists of a first pair of lenses 11 and 12, each of a plano-concave cylindrical configuration with the cylindrical concave portion of the lenses designated by $R_2$ and $R_3$ facing each other. Positioned behind lenses 11 and 12 are a pair of plano-convex cylindrical lenses 13 and 14 with the convex cylindrical surfaces facing the flat surface of lens 12.

Essentially, the above noted system is capable of increasing the field of view up to 100 percent. Experimentally, such systems have been designed and used starting at 20 percent increase in the field of view and in additional steps of 20 percent up until 100 percent increases in the field. A set of anamorphic lens systems in providing such field increases consists of $-1.2X$, $-1.4X$, $-1.6X$, and $-1.8X$ minifications.

It is of course understood that in the above notation the negative or minus sign indicates minification. To obtain more than 100 percent minification, two anamorphic lens systems such as shown in FIG. 1 can be accommodated in a single tube as an auxiliary tube where one lens system is placed in front of the other. Thus, if an anamorphic lens system of $-1.2X$ is mounted in front of a $-2.0X$ system within a common tube, the resulting minification effect will be the product of the two or a total minification of $-2.4X$. The practitioner can use $-1.8X$ times $-2.0X$ to obtain a maximum minification of $-3.6X$ or a 3.6X increase in the patient's visual field. Such combinations of anamorphic lens systems can be combined into a single system within the telescopic spectacle housing to enable use by the patient. In regard to the system shown in FIG. 1, an assembly of the dimensions necessary to produce a 80 percent increase in field of view with a minification of $-1.8X$ will be given. The dimensions specified are in millimeters.

Cylindrical lens 11 has a front flat surface designated as $R_1$ of infinite radius. The axial thickness of the lens is 1.5 mm. The radius $R_2$ associated with lens 11 to 26 mm. The axial distance $d_1$ between lenses 11 and 12 is 9 mm. The radius $R_3$ of cylindrical lens 12 is 32.3 mm with the radius $R_4$ being infinite and with the axial thickness of lens 12 being 1.5 mm. The front diameter of each lens is 30 mm. Positioned behind cylindrical lenses 11 and 12 are cylindrical lenses 13 and 14. Cylindrical lens 13 has an outer cylindrical surface radius $R_5$ of 46 mm and is separated from lens 12 on axis by 9.6 mm. The axial thickness of lens 13 is 2.5 mm, and it has a diameter of 24 mm. The back surface of the lens $R_6$ is of infinite diameter. Positioned behind lens 13 is cylindrical lens 14 which has an outer surface $R_7$ of 46 mm and is spaced from lens 13 on axis by 1.0 mm with the axial thickness of lens 14 being 2.5 mm and having an outer diameter of 21 mm with the surface $R_8$ being plano cylindrical of an infinite radius.

The curved surfaces of the lenses are cylindrical, the axes of the cylinders being vertical and the lenses are typically fabricated from SK 16 glass which is an optical grade glass. This glass is available from any manufacturer such as Schott Glass Co. and so on. The cylindrical axis of each lens must be mounted to be set exactly vertical throughout the system.

Essentially, the above dimensions afford the lens systems shown in FIG. 1 which has a minification of $-1.8X$ and which enables an increase in a patient's field of view of 80 percent.

While the above described system employs cylindrical lenses, one could employ an amorphic system using toric lenses. In such a system the vertical meridian would provide a magnification of $+1.3X$ for example, and a minification in the horizontal meridian of for example $-2.0X$.

Such a system could be employed for patients with tunnel vision having a visual acuity of 50 percent normal. Thus the 1.3X would give such a patient 30 percent more improvement vertically or 65 percent of normal acuity and widen his field two times horizontally.

The toric lenses can be employed in place of cylindrical lenses and can provide magnification in the vertical meridian and minification in the horizontal meridian.

As indicated above, if a toric lens system is provided, the vertical magnification should be small ($+1.3X$) as to not interfere with the patient's depth perception.

Figure 2:
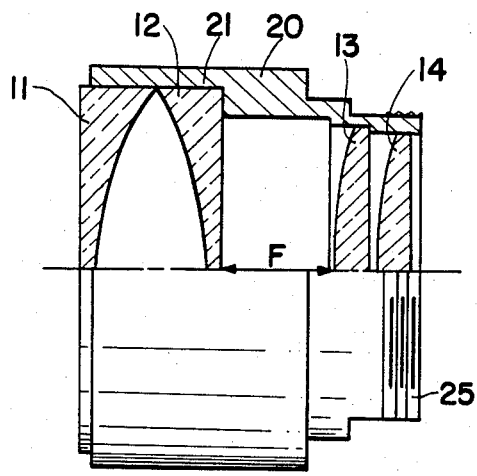
FIG. 2 is a cross sectional view of a telescopic housing for the anamorphic lens assembly.

Referring to FIG. 2, there is shown a housing 20 which accommodated the lens system shown in FIG. 1. Essentially, the lenses 11 and 12 are secured within a front section of the housing 21 with the top portions of the lenses shown in detail. Lenses 13 and 14 are positioned as shown and separated from lenses 11 and 12 by the distance F which in the above example is 9.6 mm. The lens 14 is of a smaller diameter than lens 13. (FIG. 2).

Figure 3:
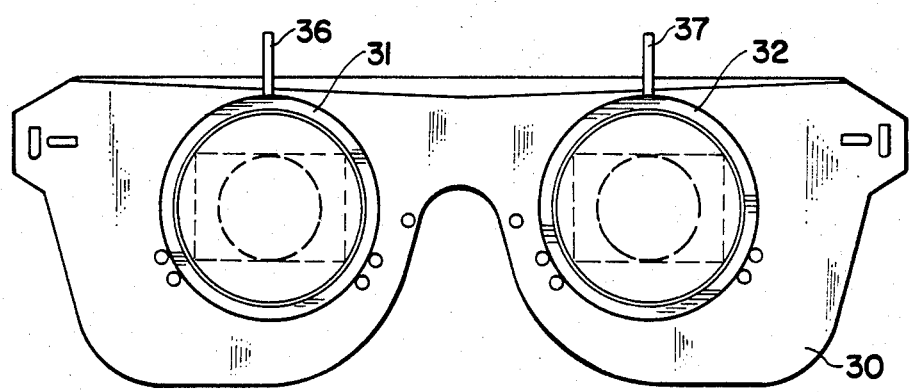
FIG. 3 is a front plan view of a trial frame employed in testing patients for this invention.
Figure 4:
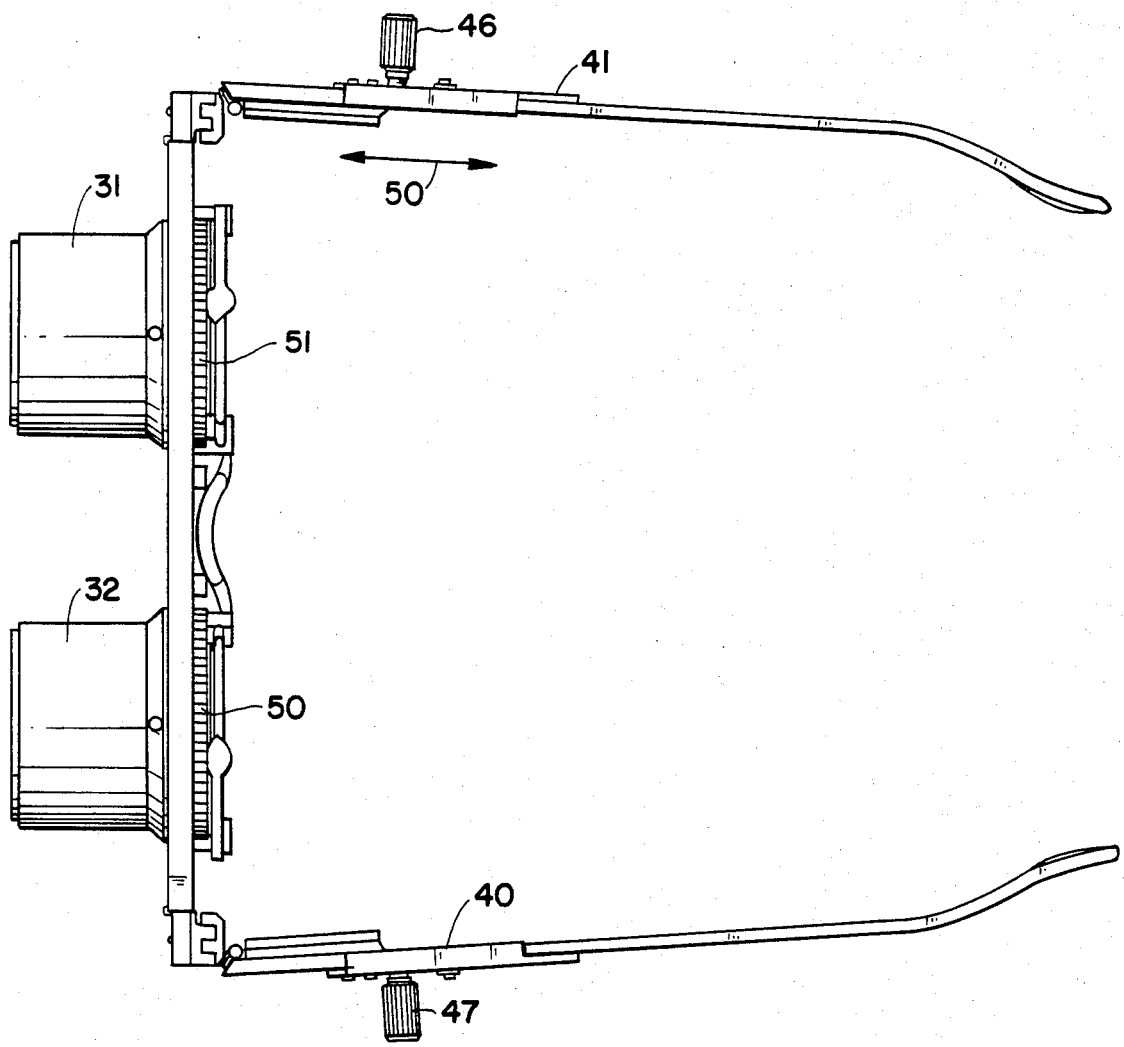
FIG. 4 is a top plan view of the trial frame.
Figure 5:
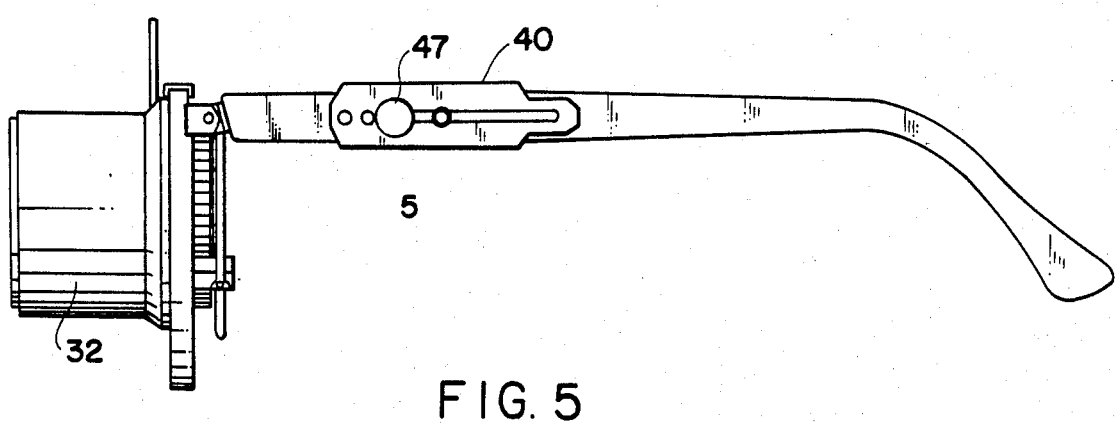
FIG. 5 is a side elevational view of the trial frame.

The housing 20 is a tube which has a threaded rear eyepiece portion 25 so that it can be mounted in a trial frame assembly as depicted in FIGS. 3, 4, and 5. The peripheral edge of the housing 20 is milled flat near the top of lens 13 so that it can slide in the horizontal direction within the rectangular apertures shown dashed in FIG. 3. For finished spectacles for a patient, the thread is omitted and the housing cemented into a carrier.

Referring to FIG. 3, there is shown a front view of a trail frame 30 which holds two anamorphic lens assemblies such as those depicted in FIG. 1 in housings 31 and 32. Essentially, the entire assembly as depicted in FIGS. 3, 4, and 5 is designated in the art as a trial frame. This trial frame enables the optometrist or practitioner to completely adjust for facial dimensions and visual requirements of a user. As such, the optometrist can slide the amorphic assembly horizontally only, keeping the cylindrical axes vertically aligned within the trial frame by means of accessing the upstanding rods 36 and 37. The fact that the trial frame has rectangular slots in the main body assures that the vertical axis is maintained while the horizontal position of each telescope can be changed within the confines and limitations inherent in the horizontal apertures.

Each temple as shown in FIGS. 4 and 5 as 40 and 41 may be adjusted in the horizontal direction by means of an adjustment screw as 46 and 47 which enable the composite temple to be moved in the direction of the arrows 50.

Essentially, a typical trial frame such as depicted in the Figures exists in the prior art. An example of a suitable apparatus has been described in detail in U.S. Pat. No. 4,364,645, entitled ADJUSTABLE FRAME APPARATUS FOR TELESCOPIC SPECTACLES issued on Dec. 21, 1982 to William Feinbloom, the inventor herein.

Once the practitioner determines the interpupillary distance of the patient by use of the trial frame and the dimensions of the temple as well as the angles that the spectacle are to be worn, he can then prescribe a fixed telescopic assembly for the patient. For example, in older patients an auxiliary reading lens is necessary for close work as in an ordinary bifocal lens which is due to normal loss of accommodation which occurs in the eye with age. The exact strength of this reading lens is determined at the time of examination.

The above noted trial frame as discussed in the above noted patent as well as the frame shown in FIGS. 3, 4 and 5 enables the practitioner to make such adjustments. In the trial frame shown in the above noted patent the openings into which the telescopic assemblies were movably positioned were arcuate. In this concept the openings for the lens assemblies are rectangular as shown in dashed lines in FIG. 3. Therefore, the vertical dimensions are not adjustable. The lens assemblies can be moved within the rectangular openings to adjust for interpuplillary distance by rings 50 and 51. The telescopic assemblies are secured within the rectangular openings by the adjusting ring such as nuts 50 and 51 of FIG. 4 which can lock the telescopic assemblies in position.

As indicated, an auxiliary tube can be used to contain the housing 20 as shown in FIG. 2 so that the resultant tube may accommodate two complete lens systems as those of FIG. 1. Essentially, as above indicated, the optical system described operates to completely maintain the patient's visual acuity in the vertical direction whereby the image perceived in the vertical direction is exactly the same height and size as it would normally be while the minification occurs in the horizontal direction to thereby increase the horizontal field of view of the subject.

According to actual experiments, this enables the patient to substantially increase his field of view without a loss of visual acuity and with the full ability to maintain true depth judgement.

It is further understood that anamorphic lenses may be made up of 2, 3, 4, 5 and more lenses not only the four lens system shown in FIG. 1. The system depicted is a Gallilean type telescope and the invention could be carried out with a reversed cylinder telescope of the terrestial or Keppler type.

All telescopes have an objective (positive) and an eyepiece. The eyepiece can be negative as in the Gallilean telescope or positive as in the Keppler telescope. For terrestial use the Keppler system must have an image inverting means as a prism and so on. The objective or eyepiece can be each only a one lens or a lens system of 2 or 3 or 4 or more lenses each. The reason for many lenses is to correct seven different aberations as correctly as possible.

Essentially, a telescope is an optical system comprising a series of positive and negative lenses so designed that light coming from infinity, and therefore parallel, will leave the system as parallel light but produce magnification. The power of magnification (M) of a telescope is equal to the focal length of the objective divided by the focal length of the eyepiece. In the reversed amorphic lens system here described, there is a minification and M is negative. Thus as indicated, it is important to obtain minification in the horizontal meridian, but one must assure no minification in the vertical meridian to allow the user to retain his acuity and depth perception with the system, while increasing his field of view.

I claim:

1. A lens assembly for increasing the field of vision of a user having a visual handicap indicative of a condition designated as tunnel vision, said lens assembly operative to increase the field of view by minifying optically in one plane, while substantially not altering the magnification or minification in another plane transverse to said one plane, comprising:

a first lens assembly being a cylindrical concave lens assembly including a first plano-concave lens having a front flat surface of an infinite radius and a second concave surface, with a second plano-concave lens assembly having its concave surface facing said concave surface of said first lens and aligned on the same optical axis positioned at a given distance from the eye of said user with a second lens assembly being a cylindrical convex lens assembly including a first plano-convex lens having its convex surface facing the flat surface of said second plano-concave lens, with a second plano-convex lens having its convex surface facing the flat surface of said first plano-convex lens, with all of said lenses aligned with their centers on a common optical axis positioned between said first assembly and the eye of said user to enable said user to perceive with almost no reduction of his own acuity in said one plane and with a minification proportional to the increase in said field of view, in said other plane transverse to said one plane.

2. The lens assembly according to claim 1, wherein said one plane is the vertical plane and said another plane in which vision is minified is the horizontal plane.

3. The lens assembly according to claim 1, further including a tubular housing having an internal hollow for containing and positioning said concave and convex lens assemblies in optical alignment.

4. The lens assembly according to claim 1, wherein said minification provided is from −1.2X to −3.6X, with an increase in the visual field of the user of 1.2 to 3.6 times.

5. An anamorphic lens system for increasing the field of vision of a user having a visual handicap designated as tunnel vision, said lens system operative to reduce or minify object size in one plane while leaving object size in another transverse plane unaltered, comprising:

a concave lens assembly comprising first and second plano-concave lenses arranged with their centers on a common optical axis with said concave surfaces facing each other, first and second plano-convex lenses arranged with their centers on said optical axis with said convex surface of said first plano-convex lens facing the flat surface of said first plano-concave lens whereby when the eye of a user is positioned to view along said axis, an object size is minified in one plane while leaving the object size unaltered in a transverse plane.

6. The anamorphic lens system according to claim 5, wherein said one plane in which object size is minified is the horizontal plane and said another plane is the vertical plane.

7. The anamorphic lens system according to claim 5, wherein said minification is from 1.2 times to 3.6 times resulting in a field of vision increase for said user of −1.2 times to −3.6 times.

8. The anamorphic lens system according to claim 6, wherein said lenses are dimensioned to give a minification of −1.8X with and increase in the user's field of view of 80 percent said first plano-concave lens having a diameter of 30 mm with a front flat surface and a concave surface of a radius of 26 mm with a center thickness of 1.5 mm, with said second plano-concave lens of the same diameter having a radius of about 32 mm with a center thickness of 1.5 mm, with a back flat surface, with the center of said curved surfaces facing each other and separated by 9.0 mm, with said first plano-convex lens having a convex surface of 46 mm facing said back flat surface of said second plano-concave lens and having a center thickness of 2.5 mm with a flat back surface and a diameter of 24 mm, with said second plano-convex lens having a convex surface of the same radius as said first plano-convex lens and facing said flat back surface with the same thickness and diameter of 21 mm.

9. The anamorphic lens system according to claim 5, further including a tubular housing having an internal hollow for containing said concave and convex lens assemblies in optical alignment.

10. The anamorphic lens system according to claim 5, wherein all curved surfaces of said lenses are cylindrical.

11. The anamorphic lens system according to claim 5, wherein all curved surfaces are toric giving slight magnification vertically and minification horizontally.

12. A method of increasing the field of view for a person suffering from tunnel vision comprising the steps of:
minifying in a first plane by a given power,
unaltering the power in a second plane perpendicular to said first
combining said minified power with said unaltered field of view to allow said person to view a greater area in said first plane with unaltered dimensions in said second plane, wherein the steps of minifying and unaltering include placing a plano-concave lens assembly followed by a plano-convex lens assembly both of a cylindrical configuration before the eyes of a user suffering from tunnel vision.

13. The method according to claim 12, wherein said first plane is the horizontal plane and said second plane is the vertical plane.

* * * * *